(12) United States Patent
Ogawa et al.

(10) Patent No.: US 11,241,920 B2
(45) Date of Patent: Feb. 8, 2022

(54) PNEUMATIC RADIAL TIRE FOR AIRCRAFT

(71) Applicant: BRIDGESTONE CORPORATION, Chuo-ku Tokyo (JP)

(72) Inventors: Gaku Ogawa, Tokyo (JP); Takuya Matsumoto, Tokyo (JP)

(73) Assignee: BRIDGESTONE CORPORATION, Chuo-ku Tokyo (JP)

( * ) Notice: Subject to any disclaimer, the term of this patent is extended or adjusted under 35 U.S.C. 154(b) by 115 days.

(21) Appl. No.: 16/772,804

(22) PCT Filed: Dec. 19, 2018

(86) PCT No.: PCT/JP2018/046892
§ 371 (c)(1),
(2) Date: Jun. 15, 2020

(87) PCT Pub. No.: WO2019/124470
PCT Pub. Date: Jun. 27, 2019

(65) Prior Publication Data
US 2021/0162819 A1    Jun. 3, 2021

(30) Foreign Application Priority Data

Dec. 20, 2017   (JP) .............................. JP2017-244424

(51) Int. Cl.
*B60C 15/06* (2006.01)
*B60C 15/04* (2006.01)
*B60C 15/00* (2006.01)

(52) U.S. Cl.
CPC .......... *B60C 15/04* (2013.01); *B60C 15/0054* (2013.01); *B60C 15/0072* (2013.01); *B60C 2015/046* (2013.01); *B60C 2200/02* (2013.01)

(58) Field of Classification Search
CPC . B60C 15/06; B60C 15/0603; B60C 15/0018; B60C 15/0081; B60C 2015/061;
(Continued)

(56) References Cited

U.S. PATENT DOCUMENTS 5,188,686 A    2/1993  Ueyoko et al.
9,308,782 B2   4/2016  Venkataramani et al.
(Continued)

FOREIGN PATENT DOCUMENTS

CN    102407737 A    4/2012
EP      0356058 A1 *  2/1990  .......... B60C 15/024
(Continued)

OTHER PUBLICATIONS

Machine Translation: JP-2003291607-A, Unoki, Takashi, (Year: 2021).*
(Continued)

*Primary Examiner* — Kendra Ly
(74) *Attorney, Agent, or Firm* — Kenja IP Law PC

(57) ABSTRACT

Provided is a pneumatic radial tire for an aircraft including a bead core, a radial carcass and a stiffener, the radial carcass including one or more turn-up plies and one or more down plies, wherein in tire axial direction cross-sectional view, when an intersection point of a virtual circle with a ply closest to a tire axial direction inner side of the stiffener among the plies intersecting with the virtual circle having a radius that is twice as large as a diameter D of the bead core from a center O of the bead core is a point A, an intersection point of the virtual circle with a ply closest to a tire axial direction outer side of the stiffener is a point B, and a midpoint between the point A and the point B is a reference point C, then a line segment OC connecting the center O of the bead core to the reference point C has an inclination angle θ of 17° or less to a tire radial direction line passing the center O of the bead core on the tire axial direction outer side.

4 Claims, 6 Drawing Sheets

(58) Field of Classification Search
CPC .. B60C 9/0292; B60C 2009/0491; B60C 3/04
See application file for complete search history.

(56) References Cited

U.S. PATENT DOCUMENTS

| | | | |
|---|---|---|---|
| 2003/0041943 A1 | 3/2003 | Ueyoko | |
| 2003/0051789 A1 | 3/2003 | Aoki | |
| 2009/0151843 A1 | 6/2009 | Villanueva | |
| 2011/0017379 A1 | 1/2011 | Chambriard et al. | |
| 2011/0186201 A1 | 8/2011 | Buxton et al. | |
| 2012/0312442 A1 | 12/2012 | Ueyoko | |
| 2015/0328939 A1 | 11/2015 | Estenne | |
| 2019/0135051 A1 * | 5/2019 | Tomita | B29D 30/0606 |

FOREIGN PATENT DOCUMENTS

| | | | | |
|---|---|---|---|---|
| EP | 0356058 A1 | | 2/1990 | |
| GB | 2033311 A | * | 5/1980 | B60C 15/06 |
| JP | H06171326 A | | 6/1994 | |
| JP | H08048117 A | | 2/1996 | |
| JP | 2003080908 A | | 3/2003 | |
| JP | 2003291607 A | * | 10/2003 | |
| JP | 2003291607 A | | 10/2003 | |
| JP | 2009096230 A | | 5/2009 | |
| JP | 2009298342 A | * | 12/2009 | |
| JP | 2009298342 A | | 12/2009 | |
| JP | 2011509879 A | | 3/2011 | |
| JP | 2011148391 A | * | 8/2011 | |
| JP | 2015536868 A | | 12/2015 | |

OTHER PUBLICATIONS

Machine Translation: JP-2009298342-A, Oshima, Masayuki, (Year: 2021).*
Machine Translation: JP-2011148391-A, Miyazaki, Masaya, (Year: 2021).*
Jun. 23, 2020, International Preliminary Report on Patentability issued in the International Patent Application No. PCT/JP2018/046892.
Jul. 12, 2021, search result of the Extended European Search Report issued by the European Patent Office in the corresponding European Patent Application No. 18890968.3.
Apr. 2, 2019, International Search Report issued in the International Patent Application No. PCT/JP2018/046892.
Oct. 11, 2021, search result of Office Action issued by the China National Intellectual Property Administration in the corresponding Chinese Patent Application No. 201880080065.8.

* cited by examiner

PNEUMATIC RADIAL TIRE FOR AIRCRAFT

TECHNICAL FIELD

The present disclosure relates to a pneumatic radial tire for an aircraft.

BACKGROUND

A pneumatic radial tire for an aircraft (hereinafter, also referred to simply as "the tire for the aircraft" or "the tire") is for use under heavy load conditions, and hence a very high prescribed internal pressure is determined in accordance with official standards.

In such a tire for the aircraft, shearing strain generated in a rubber on a radial direction inner side of a bead core (a bead base portion) is large, and hence the rubber forming the bead base portion might deteriorate or base cracks might open in the rubber.

In a tire for an aircraft of Patent Literature 1, a proper relation is provided between a rubber thickness of a bead base portion and interference of the bead base portion to a rim at a tire axial direction cross-sectional center of a bead core, so that partial stress concentration in the bead base portion is relaxed and opening of base cracks is accordingly suppressed.

CITATION LIST

Patent Literature

PTL 1: Japanese Patent Laid-Open No. 6-171326

SUMMARY

Technical Problem

However, in a tire for an aircraft, it is desired to more reliably suppress base cracks from a viewpoint of further improving durability of the tire.

To solve the problem, it is an object of the present disclosure to provide a pneumatic radial tire for an aircraft, which is capable of suppressing opening of base cracks in a bead portion.

Solution to Problem (1) A pneumatic radial tire for an aircraft of the present disclosure is a pneumatic radial tire for an aircraft including a bead core including a pair of cable beads, a radial carcass including a plurality of plies toroidally extending between the bead cores, and a stiffener disposed adjacent to the bead core on a tire radial direction outer side of the bead core, the radial carcass including one or more turn-up plies including a windup portion wound up around the bead core from an inner side to an outer side in a tire axial direction, and one or more down plies that cover the windup portion and extend to a radial direction inner side of at least the bead core, wherein in tire axial direction cross-sectional view in a state where the tire is mounted to a rim, is not filled with an internal pressure, and is unloaded, when an intersection point of a virtual circle with a ply closest to a tire axial direction inner side of the stiffener among the plies intersecting with the virtual circle having a radius that is twice as large as a diameter D of the bead core from a center corresponding to a center O of the bead core is a point A, an intersection point of the virtual circle with a ply closest to a tire axial direction outer side of the stiffener is a point B, and a midpoint between the point A and the point B is a reference point C, then a line segment OC connecting the center O of the bead core to the reference point C has an inclination angle $\theta$ of 17° or less to a tire radial direction line passing the center O of the bead core on the tire axial direction outer side.

According to this configuration of the pneumatic radial tire for the aircraft of the present disclosure, opening of the base cracks in a bead portion can be suppressed.

Note that when the down ply "extends to the radial direction inner side of at least the bead core", it is meant that the down ply extends to the tire axial direction inner side of the tire axial direction center of the bead core. Furthermore, "the tire axial direction cross section" means a cross section cut along a plane including a tire rotational axis.

(2) In an embodiment of the pneumatic radial tire for the aircraft of the present disclosure, it is preferable that the inclination angle $\theta$ is 0° or more.

(3) In an embodiment of the pneumatic radial tire for the aircraft of the present disclosure, it is preferable that the diameter D (mm) of the bead core and a prescribed load E (N) determined for each tire satisfy a relation of Formula (I) as follows:

[Formula 1]

$$520 \leq E/D^2 \leq 940 \qquad \text{Formula (I)}.$$

Note that the above "rim" indicates an approved rim (a design rim) in an applicable size described or to be described in future in the latest edition of Aircraft Year Book or the latest edition of Engineering Design Information for Aircraft Tires (EDI) issued by the Tire and Rim Association, Inc. (TRA) in U.S. (in description of numeric values in the present description, 2017 edition is for use), but indicates a rim to be applied to the tire in case where the rim has a size that is not described in the above standard.

Furthermore, the above "prescribed load" indicates a maximum static load of a single wheel in an applicable size and ply rating described in the above standard. Additionally, "the prescribed internal pressure" in the present description indicates an air pressure (a maximum air pressure) corresponding to a maximum load capacity of the single wheel in the applicable size and ply rating described in the above standard, and in case where the size is not described in the above standard, "the prescribed internal pressure" indicates an air pressure (the maximum air pressure) corresponding to the maximum load capacity prescribed for each vehicle to which the tire is mounted.

Advantageous Effect

According to the present disclosure, a pneumatic radial tire for an aircraft which is capable of suppressing opening of base cracks in a bead portion can be provided.

DETAILED DESCRIPTION

Hereinafter, an embodiment of a tire according to the present disclosure will be described by way of example with reference to the drawings.

Figure 1:
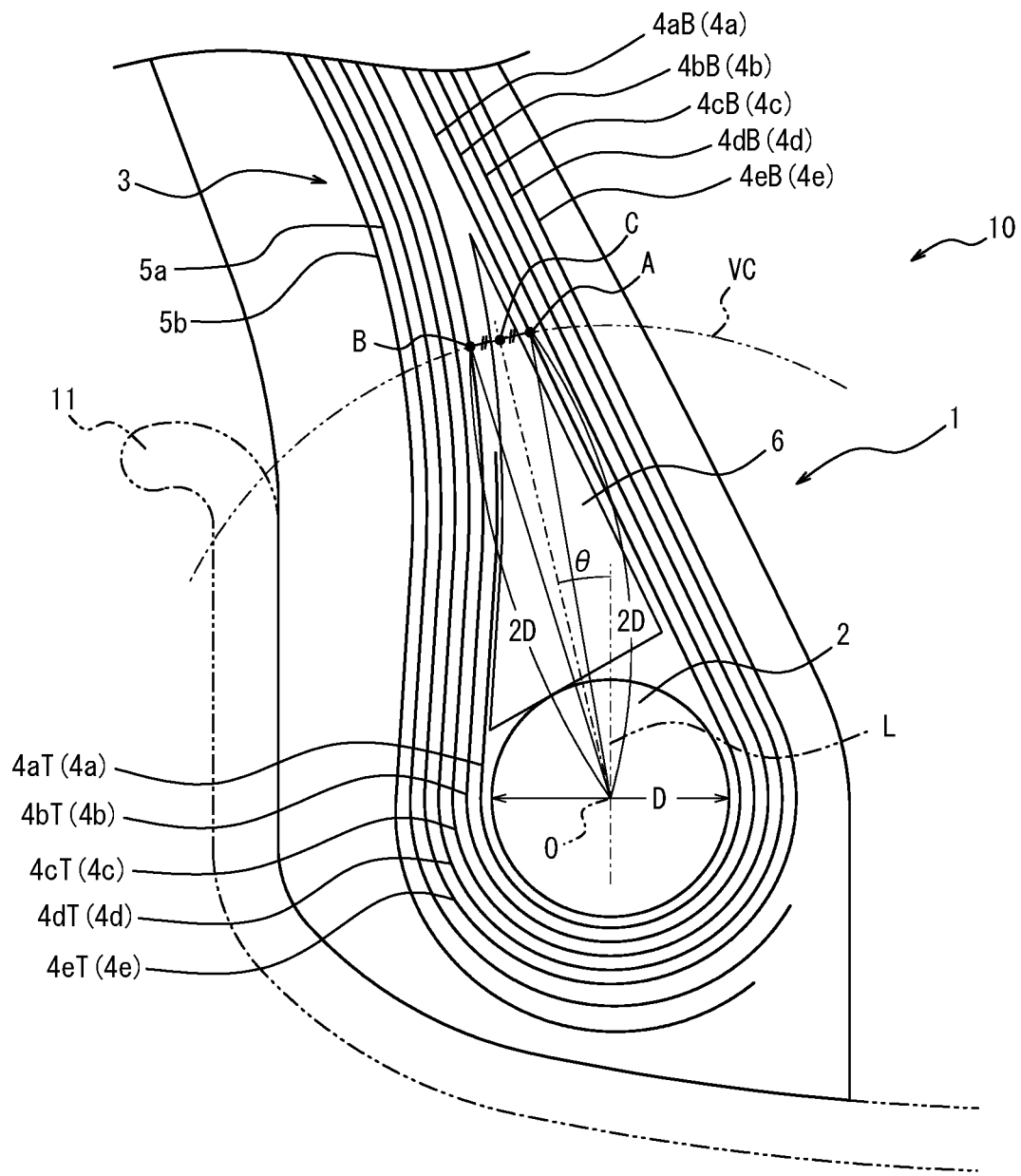
FIG. 1 is a schematic cross-sectional view schematically illustrating a tire axial direction cross section of a bead portion of a pneumatic radial tire for an aircraft according to an embodiment of the present disclosure.

A pneumatic radial tire 10 (hereinafter, referred to as "the tire 10") for an aircraft of this embodiment is partially omitted from the drawing, but includes a pair of bead portions 1, a pair of sidewall portions extending on a tire radial direction outer side of each of the bead portions 1, and a tread portion extending between the sidewall portions. FIG. 1 schematically illustrates a tire axial direction cross section of one bead portion 1 of the tire 10. Here, illustrated is a state where the tire 10 is mounted to a rim 11, is not filled with an internal pressure and is unloaded.

The tire 10 includes a bead core 2 including a pair of cable beads, a radial carcass 3 including a plurality of (in the present embodiment, seven) plies (in the present embodiment, turn-up plies 4a to 4e and down plies 5a, 5b described below in detail) toroidally extending between the bead cores 2, and a stiffener 6 disposed adjacent to the bead core 2 on a tire radial direction outer side of the bead core 2. Note that FIG. 1 illustrates the turn-up plies 4a to 4e and the down plies 5a, 5b with single lines, and illustration of thicknesses of these plies is omitted.

The bead core 2 includes annularly extending cable beads, and a cross-sectional shape of a surface of the bead core 2 that is orthogonal to an extending direction of the bead core (a cross-sectional shape in the tire axial direction) is circular or almost circular.

Furthermore, the radial carcass 3 includes one or more (in the present embodiment, five) turn-up plies 4a to 4e including ply main bodies 4aB to 4eB toroidally extending between the bead portions 1 and ply windup portions 4aT to 4eT wound up around the bead core 2 from an inner side to an outer side in the tire axial direction, and one or more (in the present embodiment, two) down plies 5a, 5b that toroidally extend between the bead portions 1, cover the ply windup portions 4aT to 4eT from the tire axial direction outer side and extend to the radial direction inner side of at least the bead core 2.

In this example, the ply windup portion 4aT of the turn-up ply 4a terminates on a tire axial direction outer side of the stiffener 6, and the ply windup portions 4bT to 4eT of the other turn-up plies 4b to 4e extend to the sidewall portion, and terminate near a tire maximum width position, although not illustrated in the drawing. Furthermore, in this example, the down plies 5a, 5b extend to a tire axial direction inner side of a center O of the bead core 2 to terminate. Additionally, respective end portions of the down plies 5a, 5b are arranged at different positions in the tire radial direction and the tire axial direction.

Furthermore, each of the turn-up plies 4a to 4e and down plies 5a, 5b in the present embodiment is a ply of an organic fiber cord covered with a rubber. Additionally, in the present embodiment, the radial carcass 3 includes five turn-up plies 4a to 4e and two down plies 5a, 5b, but the radial carcass in the tire of the present disclosure may include four or less or six or more turn-up plies, and one or three or more down plies. For example, the radial carcass in the tire of the present disclosure may include three turn-up plies, and two down plies.

Furthermore, when seen from the bead core 2, the stiffener 6 is disposed in a region surrounded with the ply main body 4aB and the ply windup portion 4aT of the turn-up ply 4a extending on an innermost peripheral side, the ply windup portion 4bT of the turn-up ply 4b extending adjacent to the turn-up ply 4a on an outer peripheral side of the turn-up ply 4a, and the bead core 2, and a cross-sectional shape of the stiffener in the tire axial direction is almost triangular. However, the stiffener in the tire of the present disclosure is not limited to this example, and the stiffener can have, for example, an irregular shape based on a trapezoidal, quadrangular or any polygonal shape.

Here, in the tire 10 of the present embodiment, in tire axial direction cross-sectional view in a state where the tire is mounted to the rim 11, is not filled with an internal pressure, and is unloaded, when an intersection point of a virtual circle VC with a ply closest to a tire axial direction inner side of the stiffener 6 (in the present embodiment, the ply main body 4aB of the turn-up ply 4a) among the plies intersecting with the virtual circle VC having a radius (2D) that is twice as large as a diameter D of the bead core 2 from a center corresponding to a center O of the bead core is a point A, an intersection point of the virtual circle VC with a ply (in the present embodiment, the ply windup portion 4bT of the turn-up ply 4b) closest to a tire axial direction outer side of the stiffener 6 is a point B, and a midpoint between the point A and the point B is a reference point C (i.e., OA=2D, OB=2D and AC=BC are set), then a line segment OC connecting the center O of the bead core to the reference point C has an inclination angle θ of 17° or less to a tire radial direction line L passing the center O of the bead core 2 on the tire axial direction outer side. Note that as described above, FIG. 1 omits illustration of a thickness of each ply, and the above described points A and B are points on a center of the thickness of each ply.

Figure 2:
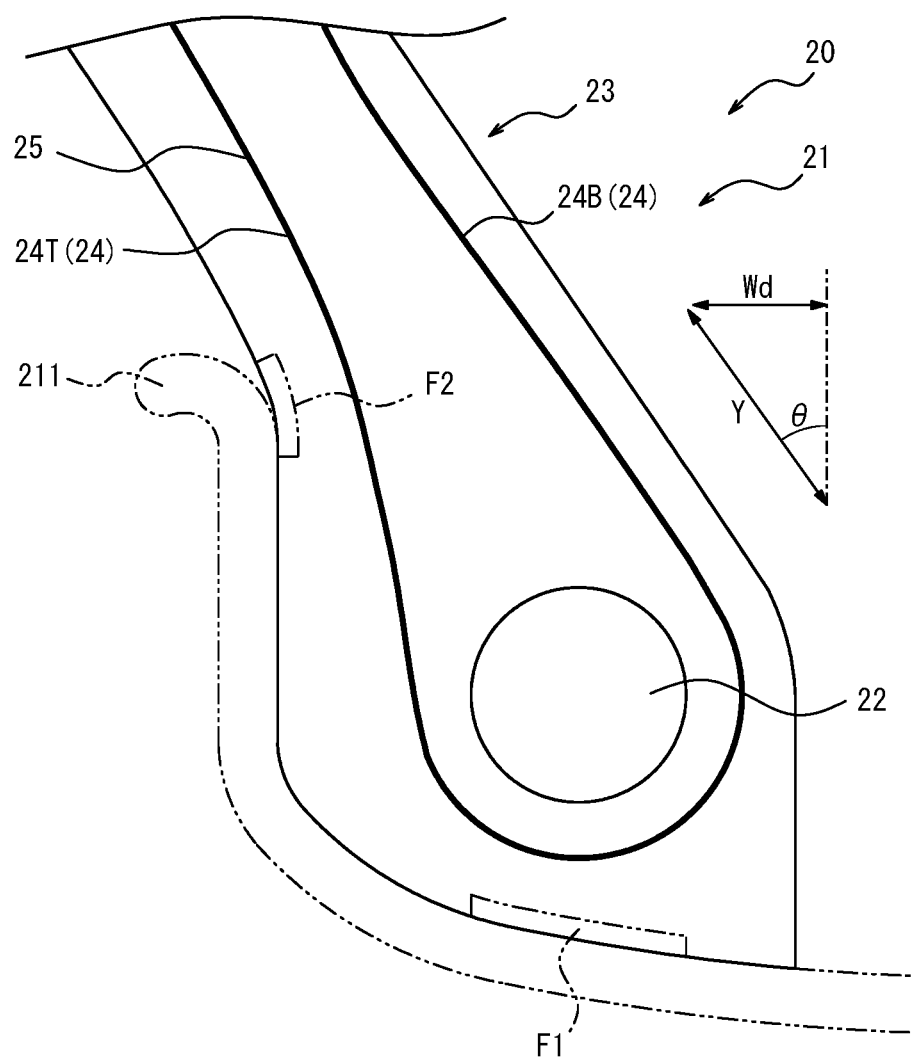
FIG. 2 is a schematic cross-sectional view schematically illustrating a tire axial direction cross section of a bead portion of a conventional pneumatic radial tire for an aircraft.

Hereinafter, a reason why the inclination angle θ is in the above range will be described with reference to FIG. 2. FIG. 2 is a schematic cross-sectional view schematically illustrating a tire axial direction cross section of a bead portion 21 of a conventional pneumatic radial tire 20 (hereinafter, referred to as "the tire 20") for an aircraft. FIG. 2 illustrates a state where the tire 20 is mounted to a rim 211, is not filled with an internal pressure, and is unloaded. Furthermore, a carcass 23 in the tire 20 includes a plurality of turn-up plies 24 and a down ply 25. FIG. 2 omits illustration of respective plies, and illustrates the carcass 23 with a bold line.

As described above, the tire for the aircraft is for use under heavy load conditions, and a prescribed internal pressure is very high. Therefore, in the tire, tension of each ply during run is easier to fluctuate than in a tire for a general passenger vehicle, a tire for a truck or a bus, a tire for a construction vehicle or the like. Specifically, upon rotation of the tire 20 in a state where the tire 20 is mounted to the rim 211, filled with the prescribed internal pressure and loaded, the tension of the plies constituting the carcass 23 decreases right under a load and the tension of the plies in another portion increases, repeatedly. In the tire for the aircraft, however, the ply tension noticeably fluctuates. If the fluctuation (arrow Y in FIG. 2) of the ply tension due to the rotation of the tire 20 increases, a tire axial direction component of the fluctuation (arrow Wd in FIG. 2) of the ply tension also increases, an amplitude of shearing strain in a cross section of a bead base portion F1 in tire axial direction cross-sectional view increases, and cracks are easily induced in the bead base portion F1.

Furthermore, in the tire axial direction cross-sectional view, a size of the shearing strain in the cross section of the bead base portion F1 also depends on an extending direction of the plies constituting the carcass 23. Specifically, the size of the shearing strain in the cross section of the bead base portion F1 depends on extending directions of both a ply main body 24B and a ply windup portion 24T in the turn-up ply 24 in an example of FIG. 2. The larger the above angle θ determined by the extending directions of both the ply main body 24B and the ply windup portion 24T is, the larger the tire axial direction component (the arrow Wd in FIG. 2) of the fluctuation of the tension of the turn-up ply 24 becomes. Therefore, if the above inclination angle θ is large and is especially in excess of 17°, the amplitude of the shearing strain in the cross section of the bead base portion F1 of a bead portion 22 increases, and the cracks are easily induced in the bead base portion F1.

In the tire 10 of the present embodiment, the above inclination angle θ is set to 17° or less, and hence the tire axial direction component of the fluctuation of the tension of the turn-up plies 4a to 4e decreases. As a result, the amplitude of the shearing strain in the cross section of the bead base portion F1 also decreases in the tire axial direction cross-sectional view, and hence opening of base cracks in the bead portion 1 can be suppressed.

Note that in case where the above inclination angle θ is 0° or more, a contact surface pressure from a rim flange to a bead back surface portion F2 (see FIG. 2) is not excessively high, and hence induction of cracks in the bead back surface portion F2 can be suppressed.

Furthermore, if the above inclination angle θ is 10° or more and 16° or less, the induction of the cracks in the bead back surface portion F2 and the opening of the base cracks in the bead portion can be more reliably suppressed.

Additionally, in the tire 10 of the present embodiment, it is preferable that the diameter D (mm) of the bead core 2 and a prescribed load E (N) determined for each tire satisfy a relation of Formula (I) as follows.

[Formula 2]

$$520 \leq E/D^2 \leq 940 \qquad \text{Formula (I)}$$

In recent years, attempts have been made to decrease the diameter of the bead core, while weight reduction of the tire is desired from environmental considerations or the like. When the diameter of the bead core is decreased, the weight reduction of the tire can be achieved. On the other hand, the bead core is easy to move following the fluctuation of the ply, and hence the cross-sectional shearing strain generated in the bead base portion tends to increase. As a result, in the tire in which the diameter of the bead core is decreased, cracks easily open in the bead base portion.

To solve the problem, in the tire that satisfies the above relation of Formula (I) and in which the diameter of the bead core is decreased, the inclination angle θ is regulated as described above. Consequently, the opening of the base cracks can be effectively suppressed in the tire in which the diameter of the bead core is decreased, and the weight reduction of the tire is compatible with the suppression of the opening of the base cracks in the bead portion.

Note that if $E/D^2$ (N/mm$^2$) is set to 940 or less, excessive shearing deformation in the stiffener 6 disposed between the ply and the bead core 2 can be prevented, and deterioration in durability of the bead portion can be avoided.

Furthermore, from a viewpoint similar to the above viewpoint, it is more preferable in the tire 10 of the present embodiment that the diameter D (mm) of the bead core 2 and the prescribed load E (N) satisfy a relation of Formula (II) as follows.

[Formula 3]

$$560 \leq E/D^2 \leq 940 \qquad \text{Formula (II)}$$

EXAMPLE

Hereinafter, examples of the present disclosure will be described, but the present disclosure is not limited to the following examples.

(Test 1)

Example tires and comparative example tires of specifications illustrated in Table 1 (both examples had a tire size of 52×21.0R22 38PR) were experimentally produced, and durability of a bead portion (resistance to base cracks) was evaluated.

Note that Example Tire 1-1 is a pneumatic radial tire for an aircraft illustrated in FIG. 1, and including a bead core 2 including a pair of cable beads, a radial carcass 3 including a plurality of plies toroidally extending between the bead cores 2, and a stiffener 6 disposed adjacent to the bead core 2 on a tire radial direction outer side of the bead core 2, the radial carcass 3 including five turn-up plies 4a to 4e including a windup portion wound up around the bead core from an inner side to an outer side in a tire axial direction, and two down plies 5a, 5b that cover the windup portion and extend to the radial direction inner side of at least the bead core 2, wherein in tire axial direction cross-sectional view in a state where the tire is mounted to a rim 11, is not filled with an internal pressure, and is unloaded, when an intersection point of a virtual circle VC with a ply main body 4aB of a turn-up ply 4a closest to a tire axial direction inner side of the stiffener 6 among the plies intersecting with the virtual circle VC having a radius that is twice as large as a diameter D of the bead core 2 from a center corresponding to a center O of the bead core 2 is a point A, an intersection point of the virtual circle VC with a windup portion 4bT of a turn-up ply 4b closest to a tire axial direction outer side of the stiffener 6 is a point B, and a midpoint between the point A and the point B is a reference point C, then a line segment OC connecting the center O of the bead core 2 to the reference point C has an inclination angle θ of 17° to a tire radial direction line L passing the center O of the bead core 2 on the tire axial direction outer side. Furthermore, $E/D^2$ is 447.4542 N/mm$^2$. The other example tires and comparative example tires are tires having the same configuration as in Example Tire 1-1 except the configuration of the specifications illustrated in Table 1.

Each sample tire was mounted to a rim, and an air pressure of 1627 kPa (equivalent pressure) and a prescribed load of 302479 N were applied. The tire was run on an indoor drum test machine at a speed of 64.4 km/h. Note that this test was performed on promotion conditions at and after a predetermined number of runs when a load being 1.2 times as large as the above prescribed load was applied to run the tire. Specifically, in first to eighth runs, a running distance per run was 10.7 km under the prescribed load, and in ninth and subsequent runs, the running distance per run was 4.3 km under the load being 1.2 times as large as the prescribed load. Based on the number of runs until the cracks opened in a bead base portion, resistance of the tire to base cracks was evaluated. Table 1 illustrates the results in an indexed manner based on a number of runs of Comparative Example Tire 1-2 being 100. A larger numeric value indicates a larger number of drum drives until the cracks open in the bead base portion, and a higher resistance to the base cracks. Note that Table 1 illustrates the above inclination angle θ simply as "angle θ".

TABLE 1

|  | Angle θ (°) | E/D² (N/mm²) | Drum drive No. (INDEX) |
| --- | --- | --- | --- |
| Example Tire 1-1 | 17 | 447.4542 | 108 |
| Comparative Example Tire 1-1 | 20 | 447.4542 | 101 |
| Example Tire 1-2 | 15 | 483.9665 | 131 |
| Example Tire 1-3 | 16 | 483.9665 | 115 |
| Example Tire 1-4 | 17 | 483.9665 | 107 |
| Comparative Example Tire 1-2 | 20 | 483.9665 | 100 |
| Comparative Example Tire 1-3 | 27 | 483.9665 | 98 |
| Example Tire 1-5 | 17 | 543.0894 | 101 |
| Example Tire 1-6 | 17 | 571.7941 | 100 |
| Example Tire 1-7 | 17 | 608.2549 | 99 |
| Comparative Example Tire 1-4 | 20 | 543.0894 | 93 |
| Comparative Example Tire 1-5 | 20 | 571.7941 | 87 |
| Comparative Example Tire 1-6 | 20 | 608.2549 | 84 |

Figure 3:
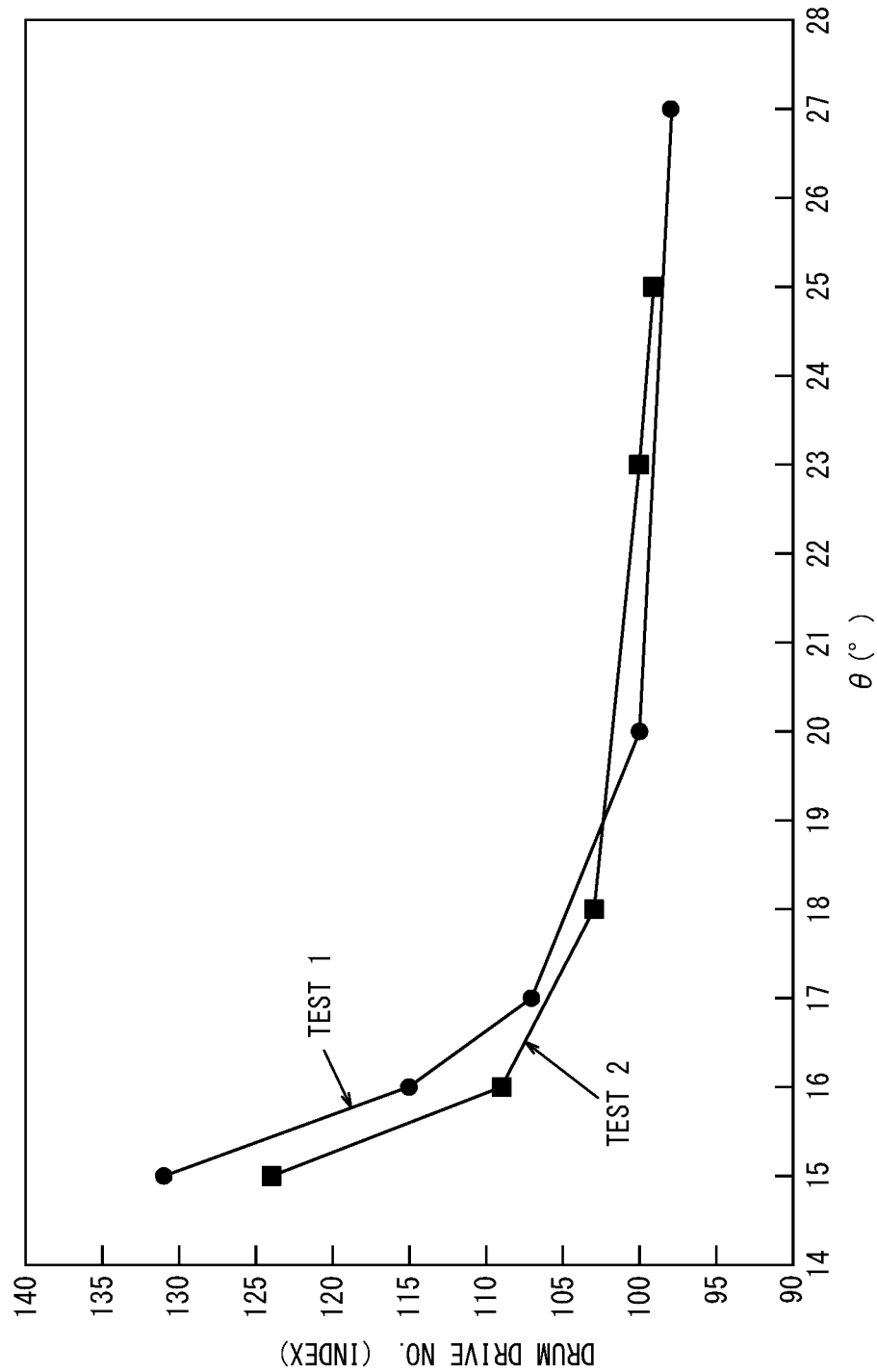
FIG. 3 is a graph illustrating test results of Tables 1, 2.

FIG. 3 is a graph illustrating a relation between an inclination angle θ (°) and a drum drive number (INDEX) in the test result of Test 1, and in the graph, the test results of Example Tires 1-2 to 1-4 and Comparative Example Tires 1-2, 1-3 having the same E/D² (N/mm²) of 483.9665 N/mm² in Table 1 are plotted with round points. Thus, it is seen that in case where the inclination angle θ is 17° or less, the number of the drum drives until the cracks open in the bead base portion is larger than in case where the inclination angle θ is in excess of 17° and that in case where the inclination angle θ is 17° or less, an increase ratio of the number of the drum drives due to decrease in the inclination angle θ noticeably increases.

Figure 4:
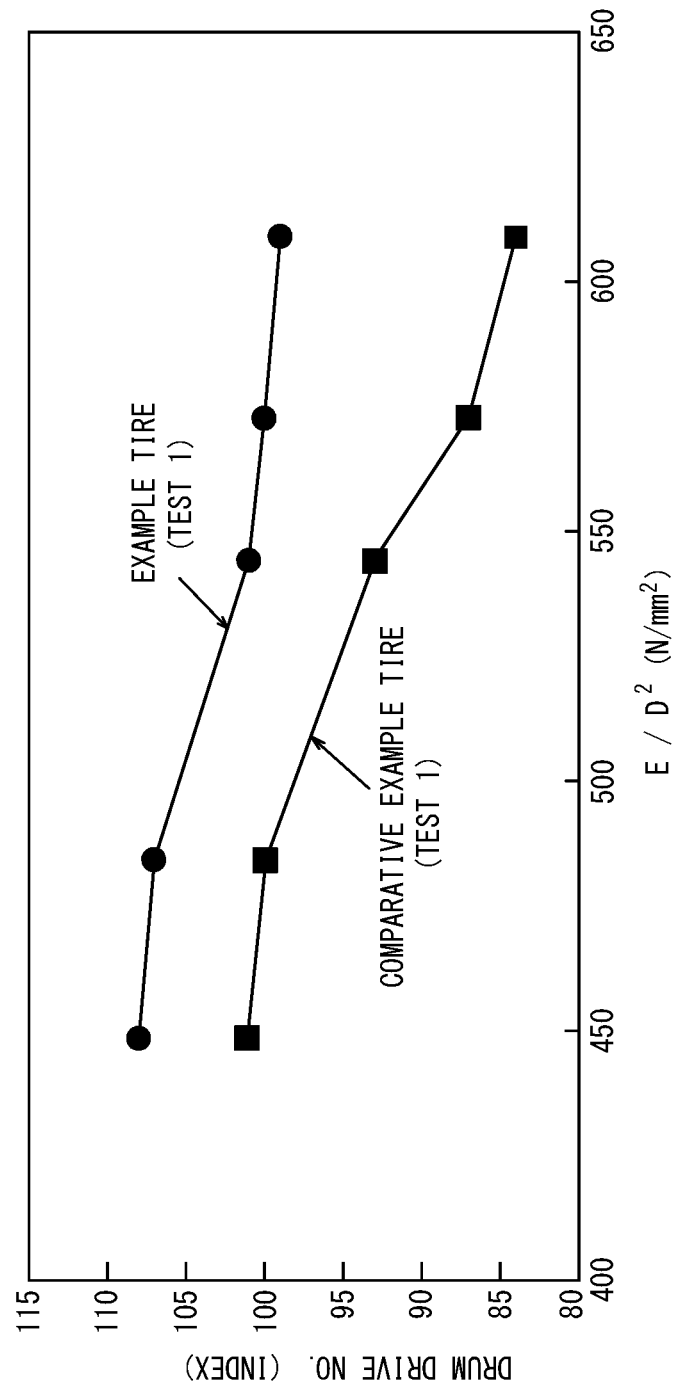
FIG. 4 is a graph illustrating the test results of Table 1.

Furthermore, FIG. 4 is a graph illustrating a relation between E/D² (N/mm²) and a drum drive number (INDEX) in the test result of Test 1, and in the graph, the test results of Example Tires 1-1, 1-4 to 1-7 having an inclination angle θ of 17° in Table 1 are plotted with round points and the test results of Comparative Example Tires 1-1, 1-2, 1-4 to 1-6 having an inclination angle θ of 20° are plotted with quadrangular points. Thus, it is seen that especially in case where E/D² is 520 N/mm² or more (i.e., the diameter of the bead core is decreased) and if the inclination angle θ is 17°, a decrease with of the drum drive number (INDEX) due to increase in E/D² (N/mm²) is smaller than in case where the inclination angle θ is 20° (i.e., in excess of 17°). Specifically, it is seen that in case where E/D² is 520 N/mm² or more and if the inclination angle θ is 17° or less, deterioration in the resistance to the base cracks can be suppressed while decreasing the diameter of the bead core and reducing the weight of the tire.

Figure 6:
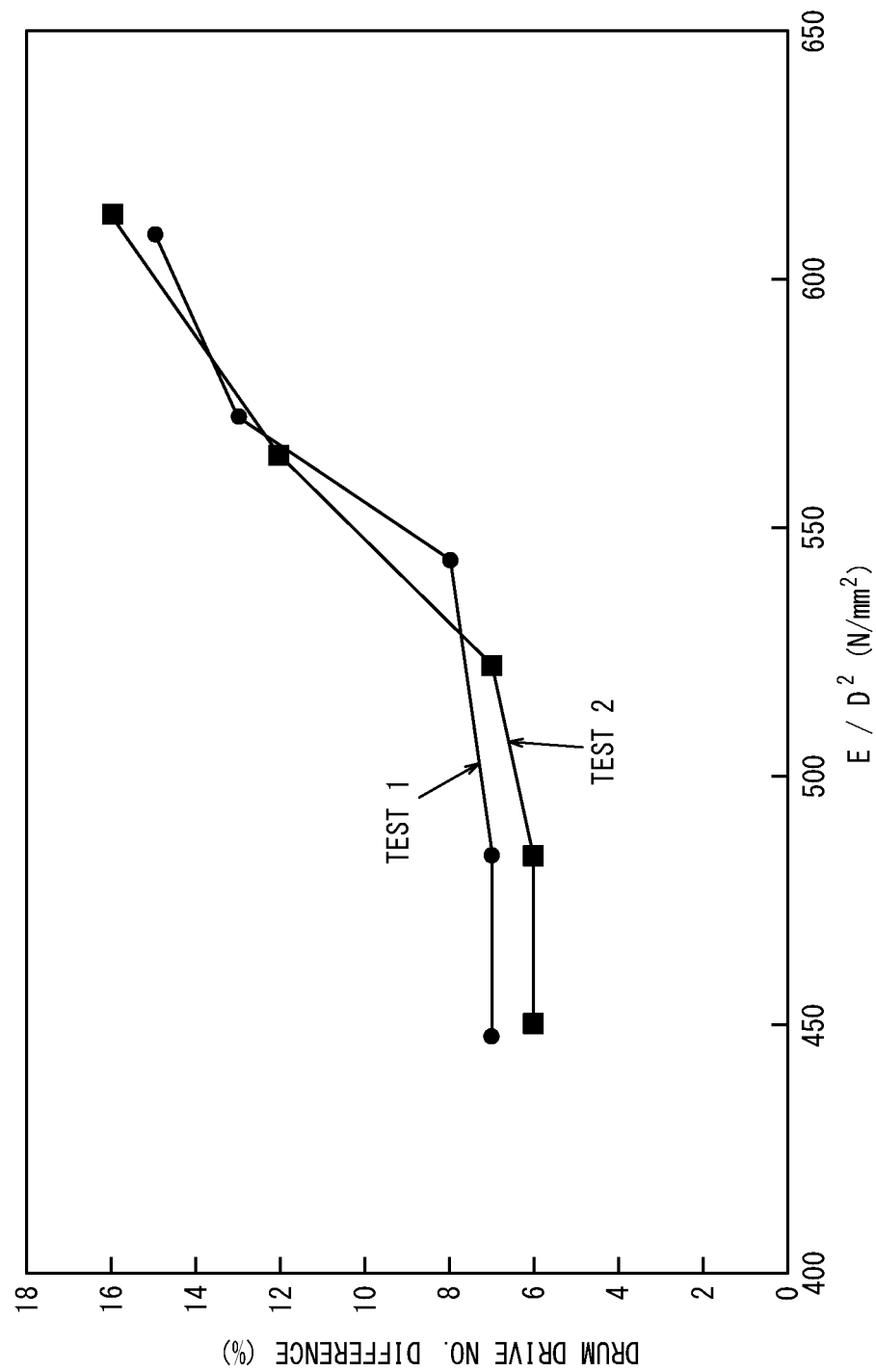
FIG. 6 is a graph illustrating the test results of Tables 1, 2.

Additionally, FIG. 6 is a graph illustrating a relation between E/D² (N/mm²) and a difference in drum drive number (INDEX) (i.e., a difference between the drum drive number (INDEX) of the example tire having an inclination angle θ of 17° and the drum drive number (INDEX) of the comparative example tire having an inclination angle θ of 20° in case where E/D² (N/mm²) is fixed) in the test result of Test 1, and in the graph, the test results of Table 1 are plotted with round points. As is clear from FIG. 6, especially in case where E/D² is 520 N/mm² or more, setting of the inclination angle θ to 17° or less is effective for increase in the drum drive number (INDEX).

(Test 2)

Example tires and comparative example tires of specifications illustrated in Table 2 (both examples had a tire size of 1400×530R23 42PR) were experimentally produced, and durability of a bead portion (resistance to base cracks) was evaluated.

Note that although illustration in the drawing is omitted, Example Tire 2-1 is a pneumatic radial tire for an aircraft being similar to Example Tire 1-1 except a tire size and a number of turn-up plies, and including a bead core including a pair of cable beads, a radial carcass including a plurality of plies toroidally extending between the bead cores, and a stiffener disposed adjacent to the bead core on a tire radial direction outer side of the bead core, the radial carcass including six turn-up plies including a windup portion wound up around the bead core from an inner side to an outer side in a tire axial direction, and two down plies that cover the windup portion and extend to a radial direction inner side of at least the bead core, wherein in tire axial direction cross-sectional view in a state where the tire is mounted to a rim, is not filled with an internal pressure, and is unloaded, when an intersection point of a virtual circle with a ply main body of a turn-up ply closest to a tire axial direction inner side of the stiffener among the plies intersecting with a virtual circle VC having a radius that is twice as large as a diameter D of the bead core from a center corresponding to a center O of the bead core is a point A, an intersection point of the virtual circle VC with a windup portion of a turn-up ply closest to a tire axial direction outer side of the stiffener is a point B, and a midpoint between the point A and the point B is a reference point C, then a line segment OC connecting the center O of the bead core to the reference point C has an inclination angle θ of 16° to a tire radial direction line L passing the center O of the bead core on the tire axial direction outer side. Each sample tire is a tire having the same configuration as in Example Tire 2-1, as a configuration other than the specifications illustrated in Table 2.

Each sample tire was mounted to a rim, and an air pressure of 1813 kPa (equivalent pressure) and a prescribed load of 352744 N were applied. The tire was run on an indoor drum test machine at an hourly speed of 64.4 km/h. Note that this test was performed on promotion conditions at and after a predetermined number of runs when a load being 1.2 times as large as the above prescribed load was applied to run the tire. Specifically, in first to eighth runs, a running distance per run was 10.7 km under the prescribed load, and in ninth and subsequent runs, the running distance per run was 4.3 km under the load being 1.2 times as large as the prescribed load. Based on the number of the runs until cracks opened in a bead base portion, resistance of the tire to base cracks was evaluated. Table 2 illustrates the results in an indexed manner based on a number of runs of Comparative Example Tire 2-3 being 100. A larger numeric value indicates a larger number of drum drives until the cracks open in the bead base portion, and a higher resistance to the base cracks. Note that Table 1 illustrates the above inclination angle θ simply as "angle θ".

TABLE 2

|  | Angle θ (°) | E/D² (N/mm²) | Drum drive No. (INDEX) |
| --- | --- | --- | --- |
| Example Tire 2-1 | 16 | 449.9285 | 110 |
| Comparative Example Tire 2-1 | 18 | 449.9285 | 104 |

TABLE 2-continued

| | Angle θ (°) | E/D² (N/mm²) | Drum drive No. (INDEX) |
|---|---|---|---|
| Example Tire 2-2 | 15 | 483.8738 | 124 |
| Example Tire 2-3 | 16 | 483.8738 | 109 |
| Comparative Example Tire 2-2 | 18 | 483.8738 | 103 |
| Comparative Example Tire 2-3 | 23 | 483.8738 | 100 |
| Comparative Example Tire 2-4 | 25 | 483.8738 | 99 |
| Example Tire 2-4 | 16 | 521.8106 | 102 |
| Example Tire 2-5 | 16 | 564.3904 | 101 |
| Example Tire 2-6 | 16 | 612.4027 | 100 |
| Comparative Example Tire 2-5 | 18 | 521.8106 | 95 |
| Comparative Example Tire 2-6 | 18 | 564.3904 | 89 |
| Comparative Example Tire 2-7 | 18 | 612.4027 | 84 |

FIG. 3 is a graph illustrating a relation between an inclination angle θ (°) and a drum drive number (INDEX) in the test result of Test 2, and in the graph, the test results of Example Tires 2-2, 2-3 and Comparative Example Tires 2-2 to 2-4 having the same E/D² of 483.8738 (N/mm²) in Table 2 are plotted with quadrangular points. Thus, it is seen that in case where the inclination angle θ is 16° or less, the number of the drum drives until the cracks open in the bead base portion is larger than in case where the inclination angle θ is in excess of 16° and that in case where the inclination angle θ is 16° or less, an increase ratio of the number of the drum drives due to decrease in the inclination angle θ noticeably increases.

Figure 5:
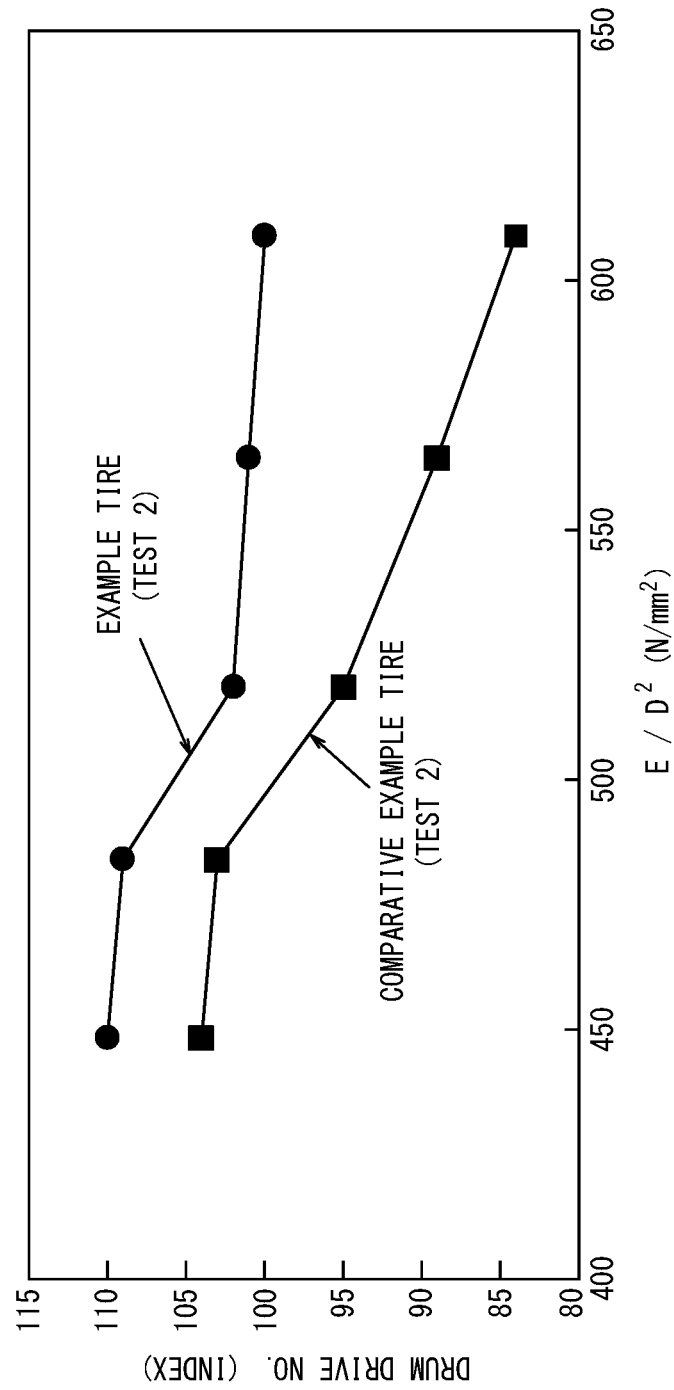
FIG. 5 is a graph illustrating the test results of Table 2.

Furthermore, FIG. 5 is a graph illustrating a relation between E/D² (N/mm²) and a drum drive number (INDEX) in the test result of Test 2, and in the graph, the test results of Example Tires 2-1, 2-3 to 2-6 having an inclination angle θ of 16° in Table 2 are plotted with round points, and the test results of Comparative Example Tires 2-1, 2-2, 2-5 to 2-7 having an inclination angle θ of 18° are plotted with quadrangular points. Thus, it is seen that especially in case where E/D² is 520 N/mm² or more (i.e., a diameter of the bead core is decreased) and if the inclination angle θ is 16°, a decrease width of the drum drive number (INDEX) due to increase in E/D² (N/mm²) is smaller than in case where the inclination angle θ is 18° (i.e., in excess of) 17°. Specifically, it is seen that in case where E/D² is 520 N/mm² or more and if the inclination angle θ is 17° or less, deterioration in the resistance to the base cracks can be suppressed while decreasing the diameter of the bead core and reducing the weight of the tire.

Furthermore, FIG. 6 is a graph illustrating a relation between E/D² (N/mm²) and a difference in drum drive number (INDEX) (i.e., a difference between the drum drive number (INDEX) of the example tire having an inclination angle θ of 16° and the drum drive number (INDEX) of the comparative example tire having an inclination angle θ of 18° in case where E/D² (N/mm²) is fixed) in the test result of Test 2, and in the graph, the test results of Table 2 are plotted with quadrangular points. As is clear from FIG. 6, especially in case where E/D² is 520 N/mm² or more, setting of the inclination angle θ to 17° or less is effective for increase in the drum drive number (INDEX).

It is seen from Test 1 and Test 2 described above that in case where the inclination angle θ is 17° or less, the increase ratio of the drum drive number due to the decrease in the inclination angle θ noticeably increases and that especially in case where the inclination angle θ is 16° or less, the increase ratio of the drum drive number due to the decrease in the inclination angle θ further increases (see FIG. 3). That is, it is seen from Test 1 and Test 2 that to suppress the opening of the base cracks in the bead portion, it is effective to set the inclination angle θ to 17° or less and that especially, it is further effective to set the inclination angle θ to 16° or less.

Furthermore, it is seen from Test 1 and Test 2 described above that in case where E/D² is 520 N/mm² or more, it is effective for the increase of the drum drive number (INDEX) to set the inclination angle θ to 17° or less and 16° or less (see FIG. 6). That is, it is seen from Test 1 and Test 2 that in case where E/D² is 520 N/mm² or more and especially in case where E/D² is 560 N/mm² or more and if the inclination angle θ is 17° or less, or preferably to 16° or less, the resistance of the bead portion to the base cracks can be improved while decreasing the diameter of the bead core and reducing the weight of the tire.

REFERENCE SIGNS LIST 1 and 21 bead portion
2 and 22 bead core
3 and 23 carcass
4, 4a, 4b, 4c, 4d, 4e and 24 turn-up ply
4aB, 4bB, 4cB, 4dB, 4eB and 24B main body of the turn-up ply
4aT, 4bT, 4cT, 4dT, 4eT and 24T windup portion of the turn-up ply
5, 5a, 5b and 25 down ply
6 stiffener
10 and 20 tire
11 and 211 rim
C reference point
D diameter of the bead core
F1 bead base portion
F2 bead back surface portion
L tire radial direction line passing center O of the bead core
O center of the bead core
VC virtual circle

The invention claimed is:

1. A pneumatic radial tire for an aircraft, comprising a bead core including a pair of cable beads, a radial carcass including a plurality of plies toroidally extending between the bead cores, and a stiffener disposed adjacent to the bead core on a tire radial direction outer side of the bead core,
   the radial carcass comprising one or more turn-up plies including a windup portion wound up around the bead core from an inner side to an outer side in a tire axial direction, and one or more down plies that cover the windup portion and extend to a radial direction inner side of at least the bead core, wherein
   in tire axial direction cross-sectional view in a state where the tire is mounted to a rim, is not filled with an internal pressure, and is unloaded,
   when an intersection point of a virtual circle with a ply closest to a tire axial direction inner side of the stiffener among the plies intersecting with the virtual circle having a radius that is twice as large as a diameter D of the bead core from a center corresponding to a center O of the bead core is a point A, an intersection point of the virtual circle with a ply closest to a tire axial direction outer side of the stiffener is a point B, and a midpoint between the point A and the point B is a reference point C,
   then a line segment OC connecting the center O of the bead core to the reference point C has an inclination angle θ of 17° or less to a tire radial direction line passing the center O of the bead core on the tire axial direction outer side.

2. The pneumatic radial tire for the aircraft according to claim 1, wherein the inclination angle θ is 0° or more.

3. The pneumatic radial tire for the aircraft according to claim 1, wherein the diameter D (mm) of the bead core and a prescribed load E (N) determined for each tire satisfy a relation of Formula (I) as follows:

$$520 \leq E/D^2 \leq 940 \qquad \text{Formula (I)}.$$

4. The pneumatic radial tire for the aircraft according to claim 2, wherein the diameter D (mm) of the bead core and a prescribed load E (N) determined for each tire satisfy a relation of Formula (I) as follows:

$$520 \leq E/D^2 \leq 940 \qquad \text{Formula (I)}.$$

\* \* \* \* \*